United States Patent
Flores Renteria et al.

(10) Patent No.: US 12,060,810 B2
(45) Date of Patent: Aug. 13, 2024

(54) LAYER SYSTEM AND BLADE

(71) Applicant: Siemens Aktiengesellschaft, Munich (DE)

(72) Inventors: Arturo Flores Renteria, Berlin (DE); Andrei Ghicov, Erlangen (DE); Torsten Neddemeyer, Falkensee (DE)

(73) Assignee: SIEMENS ENERGY GLOBAL GMBH & CO. KG, Munich (DE)

(*) Notice: Subject to any disclaimer, the term of this patent is extended or adjusted under 35 U.S.C. 154(b) by 579 days.

(21) Appl. No.: 16/759,338

(22) PCT Filed: Oct. 9, 2018

(86) PCT No.: PCT/EP2018/077458
§ 371 (c)(1),
(2) Date: Apr. 26, 2020

(87) PCT Pub. No.: WO2019/086213
PCT Pub. Date: May 9, 2019

(65) Prior Publication Data
US 2020/0308969 A1    Oct. 1, 2020

(30) Foreign Application Priority Data
Nov. 6, 2017  (DE) ............... 10 2017 219 642.4

(51) Int. Cl.
*B32B 15/04*  (2006.01)
*B32B 1/00*   (2006.01)
(Continued)

(52) U.S. Cl.
CPC ........... *F01D 5/288* (2013.01); *B32B 1/00* (2013.01); *B32B 3/02* (2013.01); *B32B 3/30* (2013.01);
(Continued)

(58) Field of Classification Search
None
See application file for complete search history.

(56) References Cited

U.S. PATENT DOCUMENTS

| | | |
|---|---|---|
| 8,152,971 B2 | 4/2012 | Quinto et al. |
| 8,858,666 B2 | 10/2014 | Schier |
| | (Continued) | |

FOREIGN PATENT DOCUMENTS

| | | |
|---|---|---|
| DE | 2421590 A1 | 11/1975 |
| DE | 102006048933 A1 | 4/2008 |
| | (Continued) | |

OTHER PUBLICATIONS

PCT International Search Report and Written Opinion of International Searching Authority mailed Dec. 4, 2018 corresponding to PCT International Application No. PCT/EP2018/077458 filed Oct. 9, 2018.

*Primary Examiner* — Humera N. Sheikh
*Assistant Examiner* — Elizabeth D Ivey
(74) *Attorney, Agent, or Firm* — Wolter Van Dyke Davis, PLLC

(57) ABSTRACT

A layer system having a metallic substrate, in particular made of a >=9% by weight chromium steel, in particular with roughness of the substrate <=2 μm and optionally an intervening chromium layer directly on the substrate, in particular made of Cr/CrN, an underlayer or middle layer of AlCr, and an outer layer, in particular outermost layer, of AlCrO, where the AlCr and AlCrO layers in particular are PVD coatings wherein a shark skin effect is achieved with a simple geometric arrangement, and can be used particularly for compressor blades.

2 Claims, 2 Drawing Sheets

(51) Int. Cl.
*B32B 3/02* (2006.01)
*B32B 3/30* (2006.01)
*B32B 9/04* (2006.01)
*F01D 5/28* (2006.01)

(52) U.S. Cl.
CPC .............. *B32B 9/041* (2013.01); *B32B 15/04* (2013.01); *B32B 15/043* (2013.01)

(56) References Cited

U.S. PATENT DOCUMENTS

| | | | |
|---|---|---|---|
| 8,980,446 B2 | 3/2015 | Engelhart et al. | |
| 2008/0090099 A1* | 4/2008 | Ramm | C23C 14/027 428/699 |
| 2008/0193782 A1* | 8/2008 | Ramm | C23C 14/024 428/469 |
| 2009/0077801 A1* | 3/2009 | Scarlin | C21D 7/06 29/889.7 |
| 2010/0209258 A1* | 8/2010 | Fuglsang | F03D 1/0633 416/90 R |
| 2011/0299996 A1 | 12/2011 | Jihlein et al. | |
| 2014/0130318 A1* | 5/2014 | Rohr | B21C 1/00 29/17.2 |
| 2015/0107544 A1 | 4/2015 | Lehnert et al. | |

FOREIGN PATENT DOCUMENTS

| | | |
|---|---|---|
| DE | 102011077620 A1 | 12/2012 |
| DE | 102011106763 A1 | 1/2013 |
| DE | 102009010110 B4 | 8/2014 |
| DE | 102015222812 A1 | 5/2017 |
| EP | 1925779 A1 | 5/2008 |
| EP | 1723311 B1 | 4/2010 |
| EP | 2862958 A2 | 4/2015 |
| EP | 2355126 B1 | 12/2015 |
| EP | 3287271 A1 | 2/2018 |
| WO | 2006084404 A1 | 8/2006 |
| WO | 2006099754 A1 | 9/2006 |
| WO | WO-2016190754 A1 * | 12/2016 ................ F28F 1/16 |

\* cited by examiner

LAYER SYSTEM AND BLADE

CROSS REFERENCE TO RELATED APPLICATIONS

This application is the US National Stage of International Application No. PCT/EP2018/077458 filed 9 Oct. 2018, and claims the benefit thereof. The International Application claims the benefit of German Application No. DE 10 2017 219 642.4 filed 6 Nov. 2017. All of the applications are incorporated by reference herein in their entirety.

FIELD OF INVENTION

The invention relates to a layer system and a blade.

BACKGROUND OF INVENTION

Coatings for compressor blades must provide protection from oxidation and erosion.

Coatings considered are frequently only those that improve surface properties.

SUMMARY OF INVENTION

The object of the invention is therefore to solve this problem.

The object is achieved via a layer system as claimed and a blade as claimed.

The dependent claims list other advantageous measures which can be combined as desired with one another in order to achieve further advantages.

DETAILED DESCRIPTION OF INVENTION

Current practice does not introduce surface structuring, because introduction of this in known coatings has been complicated.

It is advantageous that the structure of an outer layer produces a sharkskin effect. It advantageously comprises a PVD layer and/or a correspondingly hard coating.

Known coatings for compressor blades, for example layers of lacquer type, applied via liquid mixtures, generally cannot achieve this effect.

A typical advantageous PVD coating is based on aluminum-chromium and/or aluminum chromium oxide. Further underlayers can be used for appropriate modification of coefficients of thermal expansion or of protective functions.

In an advantageous embodiment, an intervening chromium layer made of chromium and of chromium nitride is applied on a substrate, surrounded by an aluminum-chromium-based base layer and an outer aluminum-chromium-oxide coating.

The figures and the description merely provide working examples of the invention.

Figure 1:
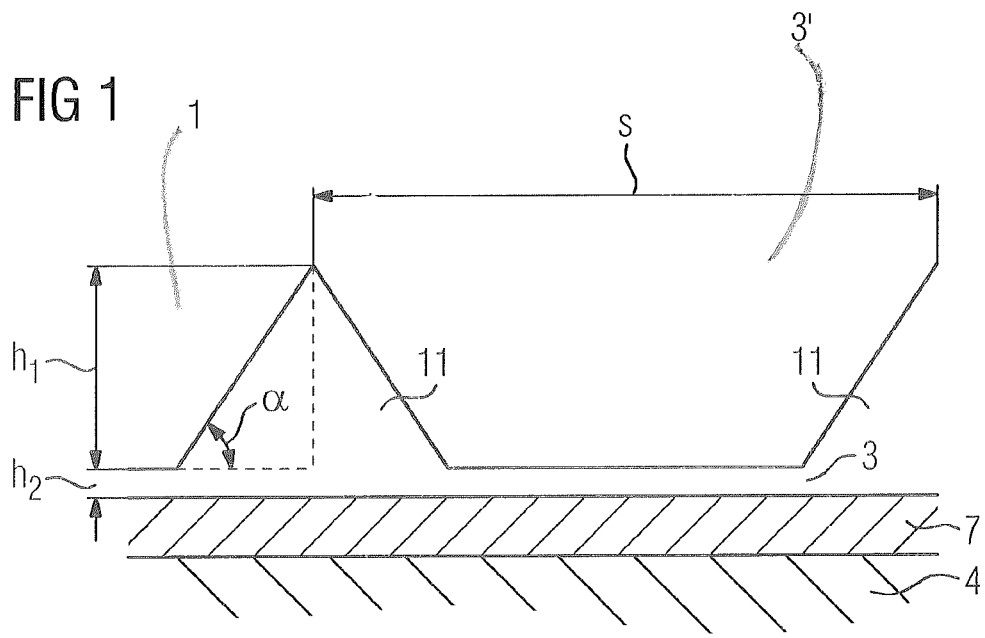
FIG. 1 is a diagram of the structure of the sharkskin.

FIG. 1 shows a cross section through a triangular linear feature 11 of a layer 1 (having portion h2 3 and portion h1 3', as discussed below) as an advantageous example of an elevation having triangular cross section.

The layer 1 has a minimum thickness h2 3, extending from which there is a linear feature 11 with height h1 3' having triangular cross section. A plurality of these triangular linear features 11 are present, and the distance between the peaks of the triangular linear features 11 is s.

The minimum thickness of residual thickness of the layer 1 forming the basis for the triangular linear feature 11 is h2 3.

It is advantageous that the triangular linear features 11 constitute an isosceles triangle with an angle $\alpha$.

The distance s is advantageously at least 2* maximum of h1, h2, and an advantageous angle $\alpha$ is between 30° and 60°.

This structure i.e. triangular linear feature h1 3' is advantageously present only in the outermost coating 3' and in particular entirely therein, i.e. without affecting and/or exposing a substrate 4.

In the case of a layer 1 comprising two or more sublayers 7, it is advantageous that the structure i.e. triangular linear feature h1 3' is present only in the outermost coating 3' and does not expose the sublayer 7 situated thereunder.

It is advantageous that the height $h1 \geq 4$ µm and that the height $h2 \geq 2$ µm.

This type of structure can be applied to a compressor blade 20 (FIG. 4), where the main area of interest is advantageously in the front region around the upstream edge (22), with the aim of reducing turbulence and increasing the efficiency level of the compressor.

Figure 4:
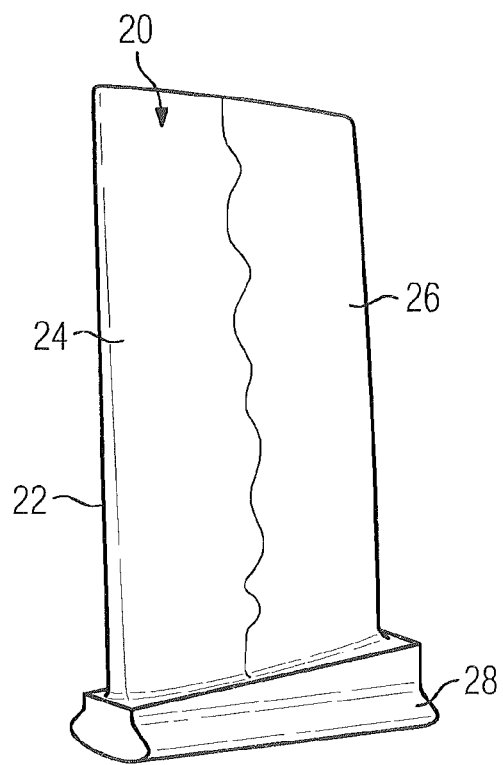

Graduated structuring of a PVD layer on compressor blade 20 surfaces as in FIG. 4 is also proposed. The surface structuring here is advantageously achieved in a single operation by means of laser beam interference processing (LBIP). In LBIP technology a laser beam is divided into two or more laser beams and then transmitted onward to the workpiece surface. The intensity of the laser undergoes periodic modulation here, and this permits structuring of the component surfaces. In the front region of the compressor blade 20 (ingoing edge) two interfering laser beams are superimposed to generate a microstructure for reduction of flow resistance (similar to sharkskin).

In the rear region of the compressor blade 20, LBIP technology is used to create a surface structure that brings about what is known as "dewetting". This greatly restricts water droplet formation on surfaces. The structuring of the surface reduces the risk of droplet formation and droplet release, thus reducing expected erosion due to droplet impact.

The transition of the surface structuring from "sharkskin" to "dewetting effect" here takes place in graduated fashion across the surface of the compressor blade 20, with displacement of the transition region from the first stage to the final stage of the compressor, in the direction of the upstream edge.

This type of coating can advantageously be applied or produced across the entire compressor blade 20.

Figure 2:
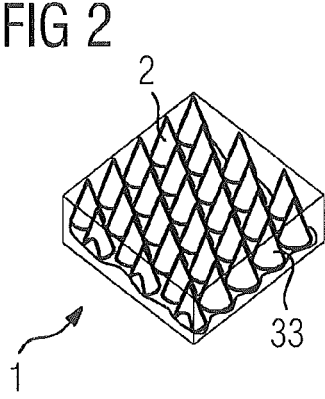
FIG. 2 shows a lotus-flower surface.

FIG. 2 shows a layer 1 with a surface 2 with lotus-flower effect.

There are many cones 33, in particular truncated cones advantageously arranged to form a grid. A cone 33 has triangular cross section.

Description of the cones 33 in respect of the height h1, the height h2 and the arrangement in the layer 1 is comparable with that of the triangular linear features 11 in FIG. 1.

The cones 33 are configured entirely within the layer 1.

Figure 3:
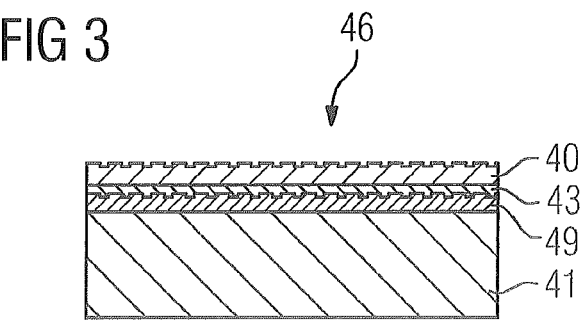
FIG. 3 shows a layer system and
FIG. 4 shows an example of a turbine blade with possible uses.

FIG. 3 shows a layer system 46 made of hard layer 40 and soft layer 43.

The triangular elevations 11 . . . ; 33, . . . are configured only in the hard layer 40, in particular in ceramic layers, for example in particular AlCrO; said hard layer 40 is also the outermost layer 3'.

The hard layer 40 is configured to be at least 10% harder than the soft layer 43.

The second layer is in particular metallic, very particularly made of AlCr.

Directly on the substrate 41 there is advantageously a cathodic protective layer 49 present which advantageously comprises an aluminum alloy or aluminum-chromium alloy.

The substrate 4, 41 is advantageously metallic, in particular made of a >=9% by weight chromium steel, and in particular has roughness <=2 μm.

FIG. 4 shows by way of example a compressor blade 20 with a blade root 28, and with an upstream edge 22 and two different surface structures 24, 26.

In the upstream region around the upstream edge 22, the sharkskin already described as per FIG. 1 is present on suction side and pressure side.

About halfway along the compressor blade 20 length, viewed in the direction of flow, the structure on suction side and pressure side changes with production of a lotus-flower-effect coating which, as depicted by way of example in FIG. 2, comprises projecting structures in the form of cones 33.

Such structures can be introduced subsequently by means of laser-beam-interference treatment.

It is advantageous that a PVD layer provides the basis for the layer 7, 3. It primarily comprises an AlCr as basis-forming layer and an externally located and overlying layer, in particular made of AlCrO.

The substrate 4 is advantageously chromium steel with at least 9% of chromium (Cr), in particular with roughness <=2 μm.

The PVD coating has the following layer structure: —Cr interlayer (made of Cr/CrN), —AlCr layer, —AlCrO layer as outer layer which then comprises the linear features 11 or cones 33.

The invention claimed is:

1. A layer system, comprising:
a metallic substrate, and
optionally an intervening chromium layer directly on the substrate,
an underlayer or a middle layer comprising AlCr, and
an outer layer comprising AlCrO,
wherein the metallic substrate is made of a >=9% by weight chromium steel.

2. A layer system, comprising:
a metallic substrate, and
optionally an intervening chromium layer directly on the substrate,
an underlayer or a middle layer comprising AlCr, and
an outer layer comprising AlCrO,
wherein the metallic substrate has a roughness of <=2 um.

* * * * *